(12) United States Patent
Kopf et al.

(10) Patent No.: US 8,619,071 B2
(45) Date of Patent: Dec. 31, 2013

(54) IMAGE VIEW SYNTHESIS USING A THREE-DIMENSIONAL REFERENCE MODEL

(75) Inventors: Johannes P. Kopf, Hamburg (DE); Michael F. Cohen, Seattle, WA (US); Daniel Lischinski, Jerusalem (IL); Matthieu T. Uyttendaele, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1106 days.

(21) Appl. No.: 12/211,596

(22) Filed: Sep. 16, 2008

(65) Prior Publication Data

US 2010/0066732 A1    Mar. 18, 2010

(51) Int. Cl.
*G06T 15/00*   (2011.01)
*G09G 5/02*    (2006.01)

(52) U.S. Cl.
USPC .......................................... 345/419; 345/589

(58) Field of Classification Search
USPC ................................. 345/419, 589
See application file for complete search history.

(56) References Cited

U.S. PATENT DOCUMENTS

| | | | |
|---|---|---|---|
| 5,179,638 A | 1/1993 | Dawson | |
| 5,245,417 A | 9/1993 | Hibi et al. | |
| 5,487,020 A | 1/1996 | Long | |
| 5,572,635 A | 11/1996 | Takizawa | |
| 6,016,150 A * | 1/2000 | Lengyel et al. | 345/426 |
| 6,148,090 A | 11/2000 | Narioka | |
| 6,184,891 B1 | 2/2001 | Blinn | |
| 6,417,850 B1 * | 7/2002 | Kang | 345/422 |
| 6,424,351 B1 * | 7/2002 | Bishop et al. | 345/582 |
| 6,462,768 B1 | 10/2002 | Oakley | |
| 6,868,190 B1 | 3/2005 | Morton | |
| 6,919,892 B1 * | 7/2005 | Cheiky et al. | 345/473 |
| 7,363,157 B1 | 4/2008 | Hanna et al. | |
| 7,397,970 B2 | 7/2008 | Han et al. | |
| 7,426,304 B2 | 9/2008 | Cheung et al. | |
| 7,889,916 B2 | 2/2011 | Miyaki | |
| 2001/0038718 A1 * | 11/2001 | Kumar et al. | 382/284 |

(Continued)

FOREIGN PATENT DOCUMENTS

WO    2007083307 A2    7/2007

OTHER PUBLICATIONS

Jean-Francois Lalonde, "Photo Clip Art", Jul. 2007, ACM Trans Graph, vol. 26 No. 3, pp. 3-1 to 3-10.*

(Continued)

*Primary Examiner* — David T Welch
(74) *Attorney, Agent, or Firm* — Lyon & Harr, LLP; Mark A. Watson

(57) ABSTRACT

A novel image view may be synthesized using a three-dimensional reference model. In an example embodiment, a device-implemented method for synthesizing a novel image view includes acts of registering, selecting, applying and synthesizing. An image is registered to at least one reference model. A source block of visual data from the image is selected with regard to a destination block of the reference model based on a source depth associated with the source block and a destination depth associated with the destination block. The destination position of the destination block of the reference model is not visible in the image. The source block of visual data from the image is applied to the destination block of the reference model to produce an image-augmented model. A novel image view is synthesized using the image-augmented model.

18 Claims, 8 Drawing Sheets

(56) References Cited

U.S. PATENT DOCUMENTS

| | | | | |
|---|---|---|---|---|
| 2002/0163519 | A1* | 11/2002 | Kitsutaka | 345/440 |
| 2003/0103670 | A1* | 6/2003 | Schoelkopf et al. | 382/162 |
| 2004/0095357 | A1* | 5/2004 | Oh et al. | 345/589 |
| 2004/0257365 | A1* | 12/2004 | Robart | 345/426 |
| 2005/0030315 | A1 | 2/2005 | Cohen et al. | |
| 2007/0116344 | A1* | 5/2007 | Hsieh et al. | 382/131 |
| 2007/0206008 | A1* | 9/2007 | Kaufman et al. | 345/424 |
| 2008/0150943 | A1 | 6/2008 | LeFrancois | |
| 2008/0260290 | A1* | 10/2008 | Velthoven et al. | 382/298 |
| 2009/0237403 | A1* | 9/2009 | Horii et al. | 345/427 |

OTHER PUBLICATIONS

Ashikhmin, M., Synthesizing natural textures, Proc. of ACM Symposium on Interactive 3D Graphics, Mar. 2001, pp. 217-226, ACM Press, New York, NY, USA.

Chen, B., G. Ramos, E. Ofek, M. Cohen, S. Drucker, and D. Nister, Interactive techniques for registering images to digital terrain and building models, Microsoft Technical Report, MSR-TR-2008-115, Aug. 2008, pp. 1-10.

Cho, P. L, 3D Organization of 2D Urban Imagery, Proc. of the 36th Applied Imagery Pattern Recognition Workshop, Oct. 2007, pp. 3-8, Washington, DC, USA.

Criminisi, A., I. Reid, A. Zisserman, Single View Metrology, Int'l J. of Comp. Vision, Nov. 2000, vol. 40, No. 2, pp. 123-148.

Debevec, P. E., C. J. Taylor, J. Malik, Modeling and rendering architecture from photographs: A hybrid geometry and image-based approach, Proc. of the 23rd Annual Conf. on Comp. Graphics and Interactive Techniques, Aug. 1996, pp. 11-20, ACM New York, NY, USA.

Debevec, P., T. Hawkins, C. Tchou, H.-P. Duiker, W. Sarokin, M. Sagar, Acquiring the reflectance field of a human face, Proc. of SIGGRAPH 2000, Computer Graphics Proceedings, Annual Conference Series, Jul. 2000, pp. 145-156.

Drori, I., D. Cohen-Or, Y. Yeshurun, Fragment-based image completion, ACM Transactions on Graphics, Jul. 2003, pp. 303-312, vol. 22, No. 3.

Efros, A. A., T. K. Leung, Texture synthesis by non-parametric sampling, Proc. of Int'l Conf. on Comp. Vision, Sep. 1999, pp. 1033-1038, vol. 2, IEEE Computer Society Washington, DC, USA.

Fattal, R., Single image dehazing, J. ACM Transactions on Graphics, Aug. 2008, vol. 27, No. 3, New York, NY, USA.

Früh, C., A. Zakhor, Constructing 3D city models by merging aerial and ground views, IEEE Comp. Graphics and Applications, Nov./Dec. 2003, pp. 52-61, vol. 23, No. 6.

GOOGLE, Google earth user guide, retrieved Jul. 16, 2008 from http://earth.google.com/userguide/v4/ug_mapfeatures.html.

Hays, J., Efros, A. A., Scene completion using millions of photographs, ACM Trans. Graph., Jul. 2007, vol. 26, No. 3.

Hertzmann, A., C. E. Jacobs, N. Oliver, B. Curless, D. Salesin, Image analogies, Proc. of the 28th Annual Conf. on Comp. Graphics, Los Angeles, Aug. 2001, pp. 327-340.

Hoiem, D., A. A. Efros, M. Hebert, Automatic photo pop-up, ACM Trans. Graph., Jul. 2005, vol. 24, No. 3, pp. 577-584.

Horry, Y., K. Anjyo, K. Arai, Tour into the picture: Using a spidery mesh interface to make animation from a single image, Proc. of the 24th Annual Conf. on Comp. Graphics, Aug. 1997, pp. 225-232, Los Angeles, CA, USA.

Kaftory, R., Y. Y. Schnechner, Y. Y. Zeevi, Variational distance-dependent image restoration, IEEE Comp. Soc. Conf. on Comp. Vision and Pattern Recognition, Jun. 2007, Minneapolis, Minnesota, USA.

Kang, S. B., Depth Painting for Image-Based Rendering Applications, Tech. Rep, CRL, Compaq Computer Corporation, Cambridge Research Lab., Dec. 1998.

Lalonde, J.-F., D. Hoiem, A. A. Efros, C. Rother, J. M. Winn, A. Criminisi, Photo clip art, ACM Trans. Graph., Jul. 2007, vol. 26, No. 3.

Loscos, C., G. Drettakis, L. Robert, Interactive virtual relighting of real scenes, IEEE Transactions on Visualization and Computer Graphics, Oct.-Dec. 2000, vol. 6, No. 4, pp. 289-305.

Narasimhan, S. G., S. K. Nayar, Contrast restoration of weather degraded images, IEEE Trans. Pattern Anal. Mach. Intell., Jun. 2003, vol. 25, No. 6, pp. 713-724.

Narasimhan, S. G., S. Nayar, Interactive (de)weathering of an image using physical models, IEEE Workshop on Color and Photometric Methods in Comp. Vision, in Conjunction with ICCV, Oct. 2003.

Natural Graphics, Natural scene designer 5.0, retrieved Jul. 16, 2008, from http://www.naturalgfx.com/index.htm.

Nayar, S. K., S. G. Narasimhan, Vision in bad weather, Int'l Conf. on Comp. Vision, Sep. 1999, pp. 820-827, Kerkyra, Corfu, Greece.

Oakley, J. P., Satherley, B. L., Improving image quality in poor visibility conditions using a physical model for contrast degradation, IEEE Transactions on Image Processing, Feb. 1998, vol. 7, No. 2, pp. 167-179, Sch. of Eng., Manchester Univ.

Oh, B. M., M. Chen, J. Dorsey, F. Durand, Image-based modeling and photo editing, Proc. of the 28th Annual Conf. on Comp. Graphics, Aug. 2001, pp. 433-442, Los Angeles, California, USA.

Schechner, Y. Y., Y. Averbuch, Regularized image recovery in scattering media, IEEE Trans. Pattern Anal. Mach. Intell., Sep. 2007, vol. 29, No. 9, pp. 1655-1660.

Schechner, Y. Y., S. G. Narasimhan, S. K. Nayar, Polarization-based vision through haze, Applied Optics, Jan. 2003, vol. 42, No. 3, pp. 511-525.

Schechner, Y. Y., S. G. Narasimhan, S. K. Nayar, Instant dehazing of images using polarization, IEEE Comp. Society Conf. on Comp. Vision and Pattern Recognition, Image Formation and Early Vision, Dec. 2001, pp. 325-332, Kauai, HI, USA.

Shade, J., S. J. Gortler, L.-W. He, R. Szeliski, Layered depth images, Proc. of the 25th Annual Conf. on Comp. Graphics, Jul. 1998, pp. 231-242, Orlando, FL, USA.

Shum, J.-Y. M. Han, R. Szeliski, Interactive construction of 3D models from panoramic mosaics, Conf. on Comp. Vision and Pattern Recognition, Jun. 1998, pp. 427-433, Santa Barbabra, CA, USA.

Snavely, N., S. M. Seitz, R. Szeliski, Photo tourism: Exploring photo collections in 3D, ACM Transactions on Graphics, Jul. 2006, vol. 25, No. 3, pp. 835-846.

Stamos, I., P. K. Allen, 3-D model construction using range and image data, 2000 Conf. on Comp. Vision and Pattern Recognition, Jun. 2000, pp. 1531-1536, Hilton Head, SC, USA.

Sunkavalli, K., W. Matusik, H. P., S. Rusinkiewicz, Factored time-lapse video, ACM Trans. Graph., Jul. 2007, vol. 26, No. 3.

Takase, Y., N. Sho, A. Sone, K. Shimiya, Automatic generation of 3D city models and related applications, Int'l Archives of Photogrammetry, Remote Sensing and Spatial Info. Sciences, Int'l Workshop Visualization and Animation of Reality-based 3D Models, vol. XXXIV-5/W10, Feb. 2003, pp. 113-120, Tarasp, Switzerland.

Tan, R. T., Visibility in bad weather from a single image, 2008 IEEE Comp. Soc. Conf. on Comp. Vision and Pattern Recognition, Jun. 2008, Anchorage, Alaska, USA.

Toyama, K., R. Logan, A. Roseway, Geographic location tags on digital images, Proc. of the Eleventh ACM Int'l Conf. on Multimedia, Nov. 2003, pp. 156-166, Berkeley, CA, USA.

Wang, J., M. Agrawala, M. F. Cohen, Soft scissors: An interactive tool for realtime high quality matting, ACM Trans. Graph., Jul. 2007, vol. 26, No. 3.

Yu, Y., J. Malik, Recovering photometric properties of architectural scenes from photographs, Proc. of the 25th Annual Conf. on Comp. Graphics, Jul. 1998, pp. 207-217, Orlando, FL, USA.

Yu, Y., P. E. Debevec, J. Malik, T. Hawkins, Inverse global illumination: Recovering reflectance models of real scenes from photographs, Proc. of the 26th Annual Conf. on Comp. Graphics, Aug. 1999, pp. 215-224, Los Angeles, California, USA.

Zhang, L., G. Dugas-Phocion, J.-S. Samson, S. M. Seitz, Single-view modelling of free-form scenes, J. of Visualization and Comp. Animation, Sep. 2002, vol. 13, No. 4, pp. 225-235.

Zhang, Z., S. Zheng, J. Zhang, Development of a browser for traffic line and terrain landscape, Int'l Archives of Photogrammetry, Remote Sensing and Spatial Info. Sciences, Int'l Workshop on Visualization and Animation of Landscape, vol. XXXIV-5/W3, Feb. 2002, Kunming, China.

Umeda, K., M. Shinozaki, G. Godin, M. Rioux, Correction of color information of a 3D model using a range intensity image, Fifth Int'l

(56) References Cited

OTHER PUBLICATIONS

Conf. on 3D Digital Imaging and Modeling, 3DIM 2005, Jun. 13-16, 2005, pp. 229-236, Ottawa, Ontario, Canada.

Du, Y., B. Guindon, J. Cihlar, Haze detection and removal in high resolution satellite image with wavelet analysis, IEEE Transactions on Geoscience and Remote Sensing, Jan. 2002, vol. 40, No. 1, pp. 210-217, Ottawa, Ont.

Liang, S., H. Fang, J. T. Morisette, M. Chen, C. J. Shuey, C. L. Walthall, C. S. T. Daughtry, Atmospheric correction of Landsat ETM+ land surface imagery. II. Validation and applications, IEEE Transactions on Geoscience and Remote Sensing, Dec. 2002, vol. 40, No. 12, pp. 2736-2746.

Narasimhan, S. G., S. K. Nayar, Removing weather effects from monochrome images, IEEE Comp. Society Conf. on Comp. Vision and Pattern Recognition, Dec. 2001, pp. 186-193, Kauai, HI, USA.

Narasimhan, S. G., C. Wang, S. K. Nayar, All the images of an outdoor scene, Proc. of the 7th European Conf. on Comp. Vision, May 2002, Part III, pp. 148-162, Copenhagen, Denmark.

Oakley, J. P., H. Bu, Correction of simple contrast loss in color images, IEEE Transactions on Image Processing, Feb. 2007, vol. 16, No. 2, pp. 511-522.

Tan, R. T., N. Pettersson, L. Petersson, Visibility enhancement for roads with foggy or hazy scenes, IEEE Intelligent Vehicles Symposium, Jun. 2007, pp. 19-24, Australian Nat. Univ., Canberra.

Zhang, M., N. D. Georganas, Fast color correction using principal regions mapping in different color spaces, Real-Time Imaging, Feb. 2004, vol. 10, No. 1, pp. 23-30.

Newman, Michael A., Office Action, U.S. Appl. No. 12/211,512, Jan. 12, 2012, pp. 1-20.

\* cited by examiner

IMAGE VIEW SYNTHESIS USING A THREE-DIMENSIONAL REFERENCE MODEL

BACKGROUND

When a photograph is taken by a camera, an image is collected by a lens and retained in some medium. Historically, the medium was typically 35 mm or some other type of film. Over the last decade or so, the medium has increasingly become digital memory. Digital cameras have become the preferred camera choice, even for many professional photographers. Digital cameras send captured images "directly" to digital memory. Of course, photographs taken with traditional film cameras can be scanned and converted into digital images. Regardless of the path taken by the image to become digitally-stored, the digital image may be manipulated in different manners for different purposes.

When images are captured outdoors, the background is often scenic or inclusive of famous landmarks. Photographers are occasionally dissatisfied with the manner in which they have framed the background and/or a foreground subject in a given image. Traditionally, photographers have resorted to cropping portions of the image to attain a framing that they consider aesthetically more pleasing or technically more impressive. Unfortunately, removing portions of the background is not always sufficient to attain a desired overall appearance for the image.

SUMMARY

A novel image view may be synthesized using a three-dimensional reference model. In an example embodiment, a device-implemented method for synthesizing a novel image view includes acts of registering, selecting, applying and synthesizing. An image is registered to at least one reference model. A source block of visual data from the image is selected with regard to a destination block of the reference model based on a source depth associated with the source block and a destination depth associated with the destination block. The destination position of the destination block of the reference model is not visible in the image. The source block of visual data from the image is applied to the destination block of the reference model to produce an image-augmented model. A novel image view is synthesized using the image-augmented model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other systems, methods, devices, media, apparatuses, arrangements, and other example embodiments are described herein.

BRIEF DESCRIPTION OF THE DRAWINGS

The same numbers are used throughout the drawings to reference like and/or corresponding aspects, features, and components.

DETAILED DESCRIPTION

Figure 1:
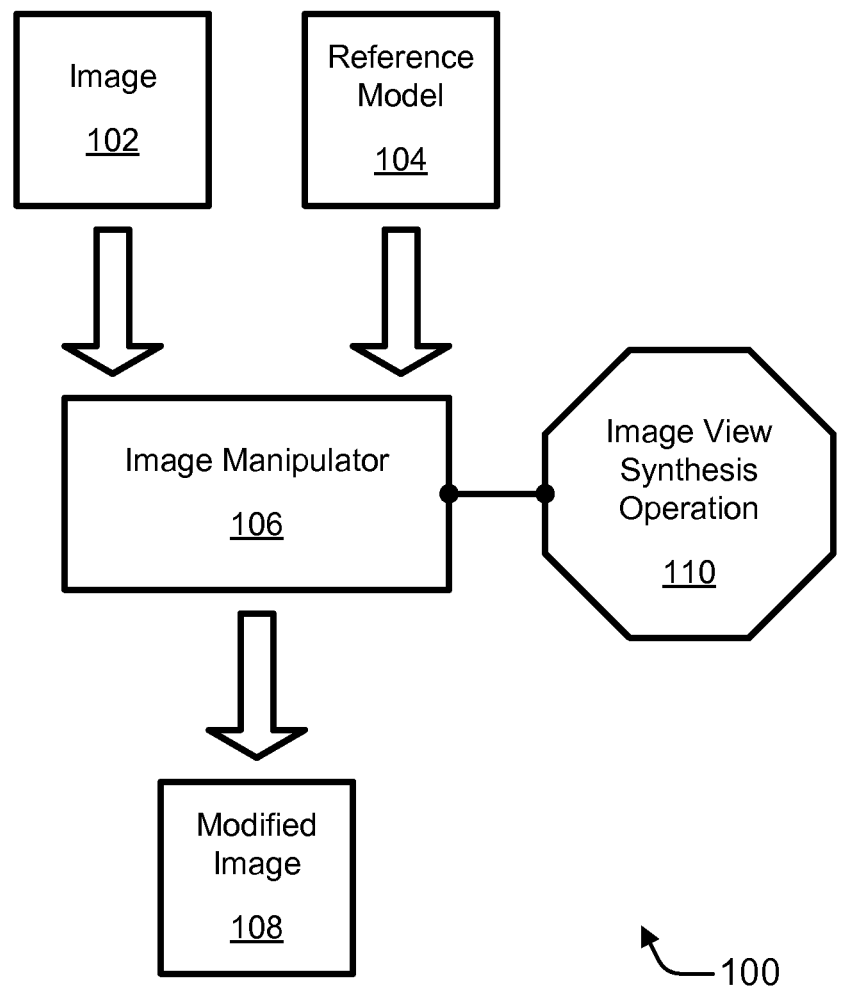
FIG. 1 illustrates an example of a general approach to producing a modified image with an image view synthesis operation using an image manipulator and based on a reference model.

Many of the images that people typically take are of a spectacular, often well-known landscape or cityscape. Unfortunately, in many cases the framing and/or the perspective are not optimal when the photographic images are taken. The resulting images may be aesthetically displeasing or incomplete. As explained herein above, an option that has been available to photographers historically is to excise portions of the image through cropping. Of course, cropping cannot improve images with incomplete backgrounds.

Despite the increasing ubiquity of digital photography, the metaphors used to browse and interact with photographic images have not changed significantly. With few exceptions, they are still treated as two-dimensional entities, whether they are displayed on a computer monitor or printed as a hard copy. Yet it is known that augmenting an image with depth information can open the door to a variety of new and exciting manipulations. Unfortunately, inferring depth information from a single image that was captured with an ordinary camera is still a longstanding unsolved problem in computer vision.

Fortunately, there is a great increase of late in the number and the accuracy of geometric models of the world, including both terrain and buildings. By registering images to these reference models, depth information can become available at each pixel of the image. This geo-registering enables a number of applications that are afforded by these newfound depth values, as well as the many other types of information that are typically associated with such reference models. These applications include, but are not limited to: dehazing (or adding haze to) images; approximating changes in lighting; novel view synthesis, which can include extending the field of view of the image, changing the view perspective of the image, adding new background objects into the image, etc.; integration of geographic information system (GIS) data into the photo browser, and so forth.

An image manipulation system that involves geo-registering is motivated by several recent trends that are now reaching critical mass. One trend is that of geo-tagged photos. Many photo-sharing web sites now enable users to manually add location information to photos. Some digital cameras feature a built-in GPS, allowing automatic location tagging. Also, a number of manufacturers offer small GPS units that allow photos to be easily geo-tagged by software that synchronizes the GPS log with the photos. In addition, location tags can be enhanced by digital compasses that are able to measure the orientation (e.g., tilt and heading) of the camera. It is expected that in the future more cameras will have such functionality and that most photographic images will be geo-tagged, even without manual efforts.

Another trend is the widespread availability of accurate digital terrain models, as well as detailed urban models. The combination of geo-tagging and the availability of fairly accurate three-dimensional (3D) models enable many images to be relatively precisely geo-registered. In the near future, partially or fully automatic geo-registration is likely to be available as an online service.

Having a sufficiently accurate match between an image and a 3D geometric model offers new possibilities for enhancing images, especially those including an outdoor and/or scenic component. For example, haze and unwanted color shifts may be removed, alternative lighting conditions may be experimented with, image views may be extended or completed, viewpoints may be changed, and so forth. These manipulations may be performed even on single outdoor images, which are taken in a casual manner without any special equipment or any particular setup. As a result, such manipulations can be applicable to a large body of existing outdoor photographic images, so long as at least the rough location where each photograph was taken is determinable.

Thus, in contrast with traditional cropping approaches to altering an image's framing or effective overall appearance, certain example embodiments that are described herein leverage the availability of increasingly accurate 3D reference models to adjust an image. Embodiments may employ a model-guided, layered depth image completion technique for novel view synthesis. The novel image view synthesis may entail, by way of example but not limitation: adding material to a background to extend it, changing a direction of view for the image, moving a capture camera position to move the view frustum, effectively adding background objects through image expansion or view direction change, combinations thereof, and so forth.

Generally, example system embodiments are described for enhancing and otherwise manipulating outdoor photographic images by "combining" them with already-existing, geo-referenced digital terrain and urban reference models. An interactive registration process may be used to align an image with such a reference model. After the image and the model have been registered, an abundance of information becomes available to the system. Examples of available information include depth, texture, color, GIS data, combinations thereof, and so forth.

This information enables a variety of operations, ranging from dehazing and relighting of the image, to novel view synthesis and overlaying of the image with geographic information. Augmenting photographic images with already-available 3D models of the world can support a wide variety of new ways for people to experience and interact with everyday snapshots. The description that follows focuses on example approaches to synthesizing novel image views.

FIG. 1 illustrates an example of a general approach 100 to producing a modified image 108 with an image view synthesis operation 110 using an image manipulator 106 and based on a reference model 104. As illustrated, approach 100 includes an image 102, reference model 104, image manipulator 106, modified image 108, and image view synthesis operation 110. Image 102 may be, for example, any digital two-dimensional image, such as those taken by digital or traditional-film cameras. Reference model 104 provides one or more 3D models of the real-world. Examples of reference models 104 are described further herein below with particular reference to FIG. 2.

In an example embodiment, image 102 and reference model 104 are provided to image manipulator 106. Image 102 is registered in conjunction with reference model 104. Image manipulator 106 performs an image view synthesis operation 110 to produce modified image 108. Modified image 108 is a view-adjusted version of image 102. The view may be adjusted by extending the image, altering the viewpoint (e.g., changing the view direction and/or changing the location of the viewing frustum), effectively adding background objects, combinations thereof, and so forth. As described further herein below, image view synthesis operation 110 entails adjusting the view of image 102 based on depths of blocks in image 102 and depths of blocks of reference model 104. Image manipulator 106 may be realized as software, firmware, hardware, fixed logic circuitry, some combination thereof, and so forth.

Figure 2:
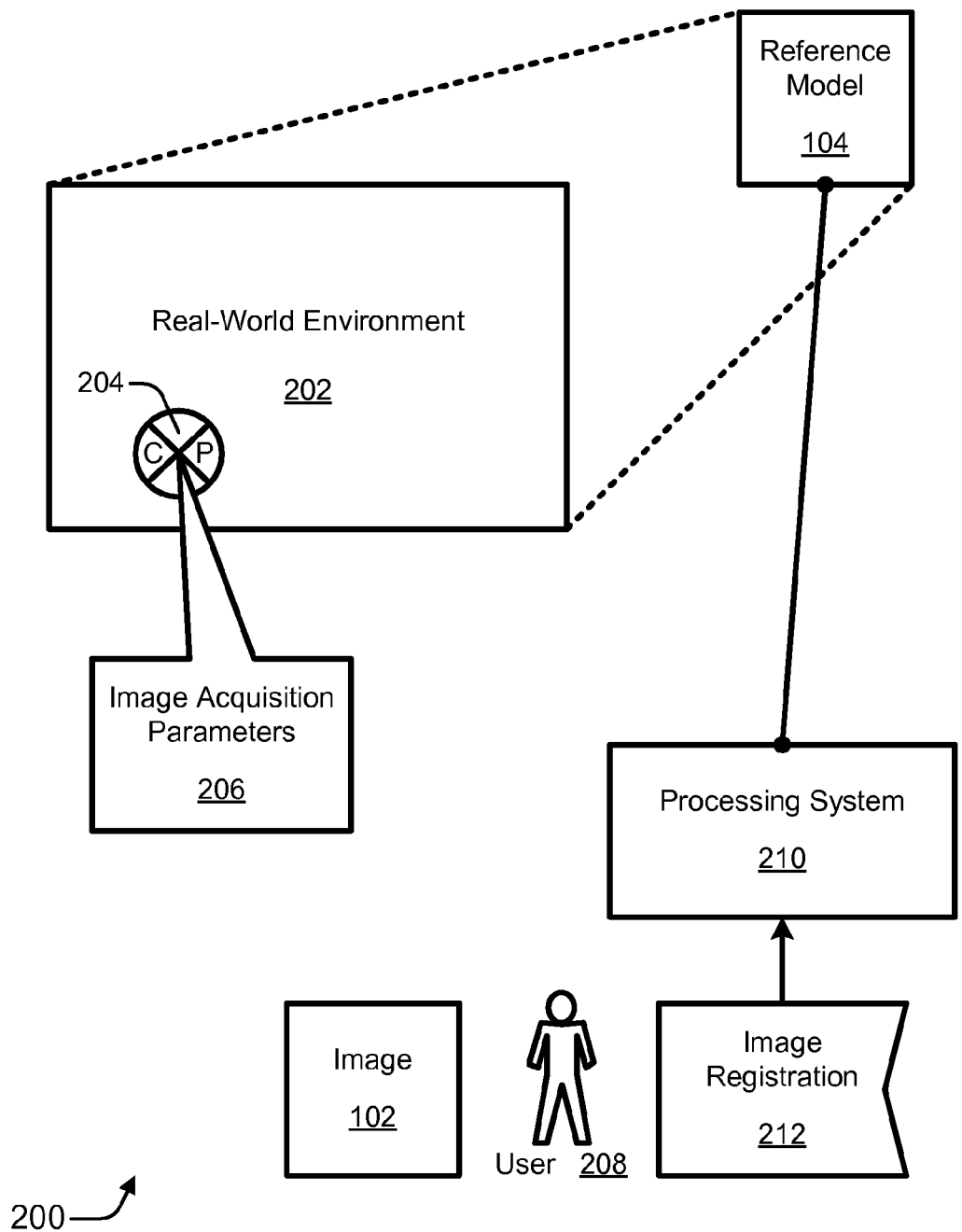
FIG. 2 illustrates an example of a general scheme for registering an image with a reference model.

FIG. 2 illustrates an example of a general scheme 200 for registering image 102 with reference model 104. As illustrated, scheme 200 includes a real-world environment 202, a camera (or capture) position 204, image acquisition parameters 206, and a user 208. Scheme 200 also includes a processing system 210 and an image registration 212 in addition to image 102 and reference model 104.

In an example embodiment, reference model 104 generally corresponds to real-world environment 202. More specifically, but by way of example only, respective individual locations, points, and visible subject matter of real-world environment 202 correspond to respective 3D maps, pixels, and textures of reference model 104. Processing system 210 includes or otherwise has access to reference model 104. Processing system 210 may be a discrete device or a distributed set of two or more devices interconnected by a network and formed from software, firmware, hardware, fixed logic circuitry, some combination thereof, and so forth. Processing system 210 may include image manipulator 106 (of FIG. 1).

Reference models 104 may be created or acquired from any of many possible sources. For example, due to commercial projects that attempt to reproduce the Earth visually on the web, both the quantity and the quality of such models are rapidly increasing. In the public domain, NASA for instance provides detailed satellite imagery (e.g., from Landsat) and elevation models (e.g., from Shuttle Radar Topography Mission). Also, a number of cities around the world are creating detailed 3D models of their cityscape (e.g., New York, Berlin 3D, etc.).

It should be noted that while the reference models that are mentioned herein are fairly detailed, they are still far from the degree of accuracy and the level of detail one would need in order to use these models alone to directly render photographic-quality images. Instead, the 3D information afforded by the use of these models may be leveraged while at the same time the photographic qualities of the original image may be at least largely preserved.

Initially, a user 208 captures image 102 in real-world environment 202 at camera position 204. Associated with this camera position 204 and the act of capturing image 102 are image acquisition parameters 206. Using processing system 210, user 208 performs image registration 212 to register image 102 in conjunction with one or more reference models 104. In this manner, one or more parameters of image acquisition parameters 206 are used to link image 102 to the data in reference model 104. The registration process may be fully or partially manual or automatic.

Assuming that image 102 has been captured by a, e.g., pin-hole camera, image acquisition parameters 206 may include position, pose, and focal length (e.g., seven parameters in total). To register such an image to a 3D geometric model of a scene, it suffices to specify four or more corresponding pairs of points. By way of example, camera position 204 may be specified for image registration 212 with a location (e.g., spatially in three dimensions) and three angles of the camera (e.g., two directional angles and one field of view angle). Assuming that the approximate position (e.g., camera position 204) from which the image was taken is available (e.g., from a geotag, as provided independently from the user, etc.), the model may be rendered from roughly the correct position. If the user specifies sufficiently numerous correspondences between the image and the reference model, the parameters may be recovered by solving a nonlinear system of equations.

It should be noted that reference models are less likely to include models of foreground objects that are dynamic or less permanent, such as people, cars, and even individual trees. For images depicting foreground objects that are not contained in the reference model, the user may matte out the foreground before combining the remainder of the image with the reference model. Usually, for the novel image view synthesizing applications described herein, the matte does not need to be overly accurate, especially if it is conservative (e.g., substantially all of the foreground pixels are contained in the matte).

When the foreground is manually matted out by the user, the matting process can typically be completed in about 1-2 minutes per image. So, for some images, the user first spends some time on interactive matting prior to image manipulation. It should be noted that as a consequence of the matting, the fidelity of some of the image manipulations with regard to the foreground may be reduced. After the image manipulations, the matted foreground may be composited back into the overall photographic image.

Figure 3:
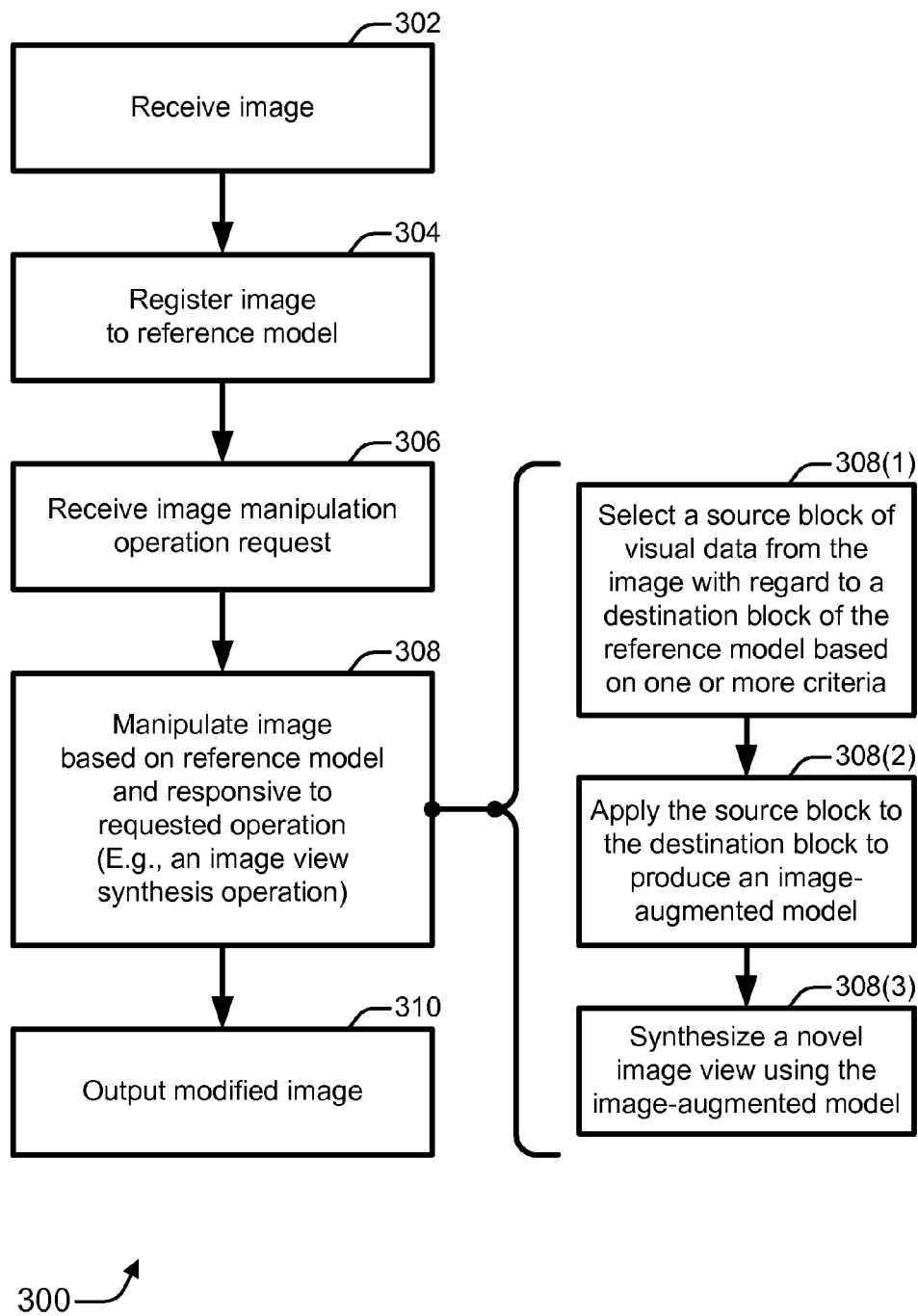
FIG. 3 is a flow diagram that illustrates an example of a method for manipulating an image to synthesize a novel view based on a reference model.

FIG. 3 is a flow diagram 300 that illustrates an example of a method for manipulating an image to synthesize a novel view based on a reference model. Flow diagram 300 includes eight blocks 302-310, 308(1), 308(2), and 308(3). Implementations of flow diagram 300 may be realized, for example, as processor-executable instructions and/or as part of image manipulator 106 (of FIG. 1) or processing system 210 (of FIG. 2). Example relatively quantitative embodiments for implementing flow diagram 300 are described below using the concepts, terminology, and elements of FIGS. 4A, 4B, and 5.

Figure 7:
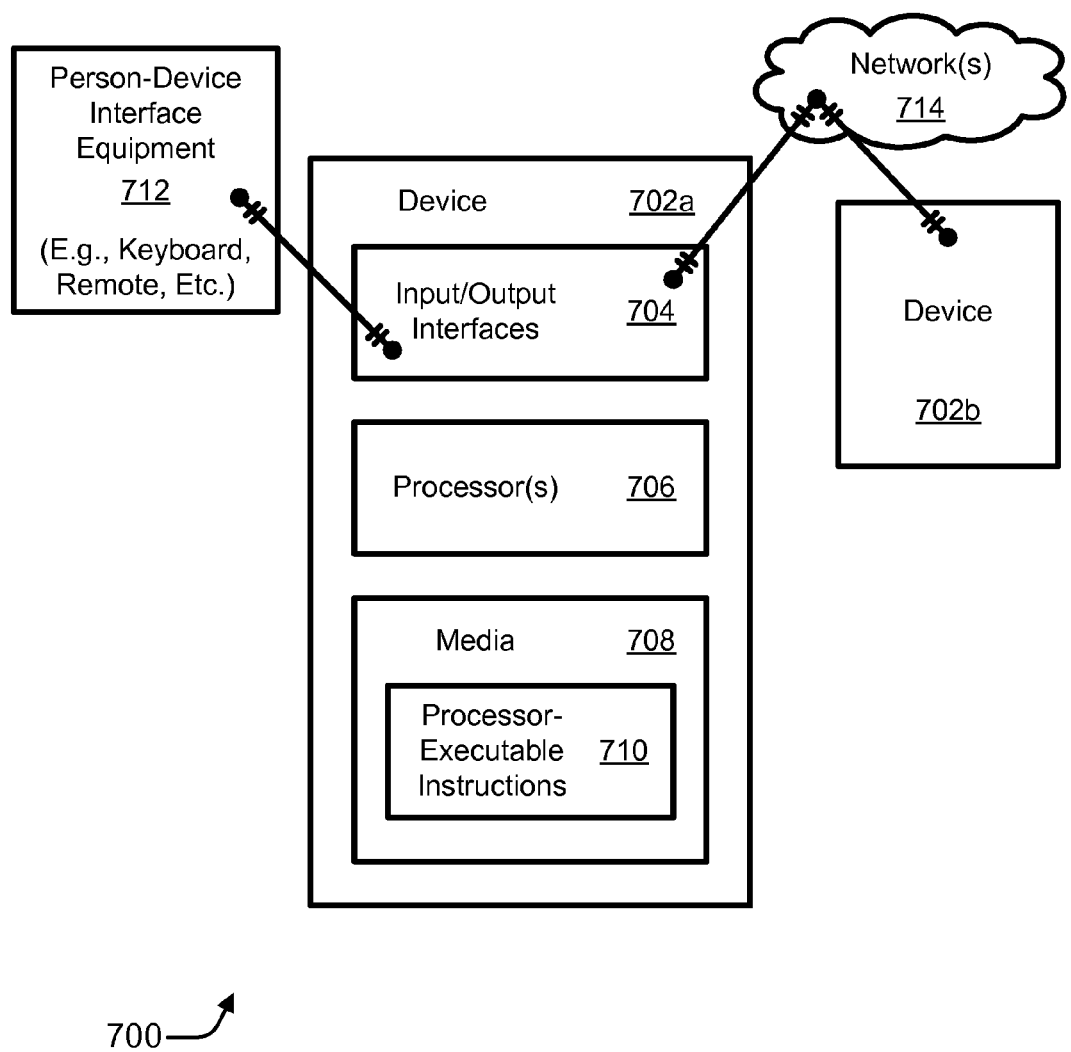
FIG. 7 is a block diagram illustrating example devices that may be used to implement embodiments for image view synthesis using a three-dimensional reference model.

The acts of flow diagram 300 that are described herein may be performed in many different environments and with a variety of different devices, such as by one or more processing devices (e.g., of FIG. 7). The order in which the method is described is not intended to be construed as a limitation, and any number of the described blocks can be combined, augmented, rearranged, and/or omitted to implement a respective method, or an alternative method that is equivalent thereto. Although specific elements of certain other FIGS. (e.g., FIGS. 1 and 2) are referenced in the description of this flow diagram, the method may be performed with alternative elements.

For example embodiments, at block 302, an image is received. For example, user 208 may store, input, upload, or otherwise provide image 102. At block 304, the image is registered to a reference model. For example, user 208 may register image 102 in conjunction with one or more reference models 104 using processing system 210. At block 306, an image manipulation operation request is received. For example, processing system 210 and/or image manipulator 106 may receive a request to perform an image view synthesis operation 110. The request may be submitted by user 208 upon providing image 102, may be selected by user 208 from among a set of image manipulation options, and so forth.

At block 308, the image is manipulated based on the reference model and responsive to the requested manipulation operation. For example, image 102 may be manipulated with image manipulator 106 by performing image view synthesis operation 110 on image 102 based on reference model 104.

More specifically, at block 308(1), a source block of visual data is selected from the image with regard to a targeted destination block of the reference model based on one or more criteria. The criteria may be, for example, a source depth of the source block and a destination depth of the destination block. Other criteria may include, for instance, corresponding spatial positions, similarities of color, proximity to previously selected blocks, and so forth.

At block 308(2), the source block of visual data is applied to the destination block of the reference model to produce an image-augmented model. For example, a texture of the destination block of reference model 104 may be replaced with or modified responsive to the visual data of the source block from image 102. The destination position of the destination block of the reference model may be such that it is not visible in the image.

At block 308(3), a novel image view is synthesized using the image-augmented model. For example, a modified image 108 including a novel view may be synthesized using the image-augmented model.

At block 310, a modified image is output. For example, modified image 108, which includes a synthesized novel view of image 102, may be output. Modified image 108 may be, for instance, stored to memory, transmitted over one or more networks (e.g., back to user 208), displayed on a screen, printed on paper, some combination thereof, and so forth.

Figure 4A:
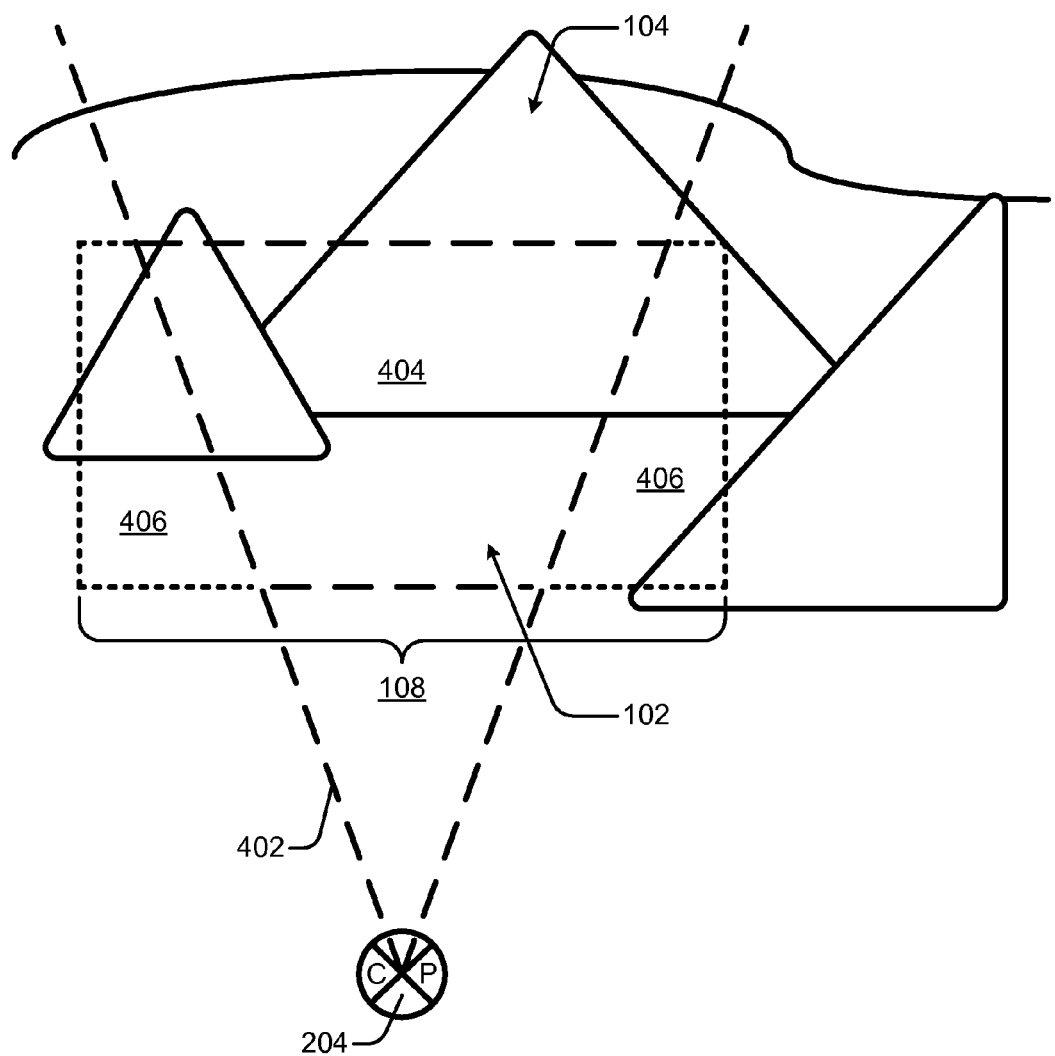
FIGS. 4A and 4B are block diagrams illustrating examples of how image views may be changed.
Figure 4B:
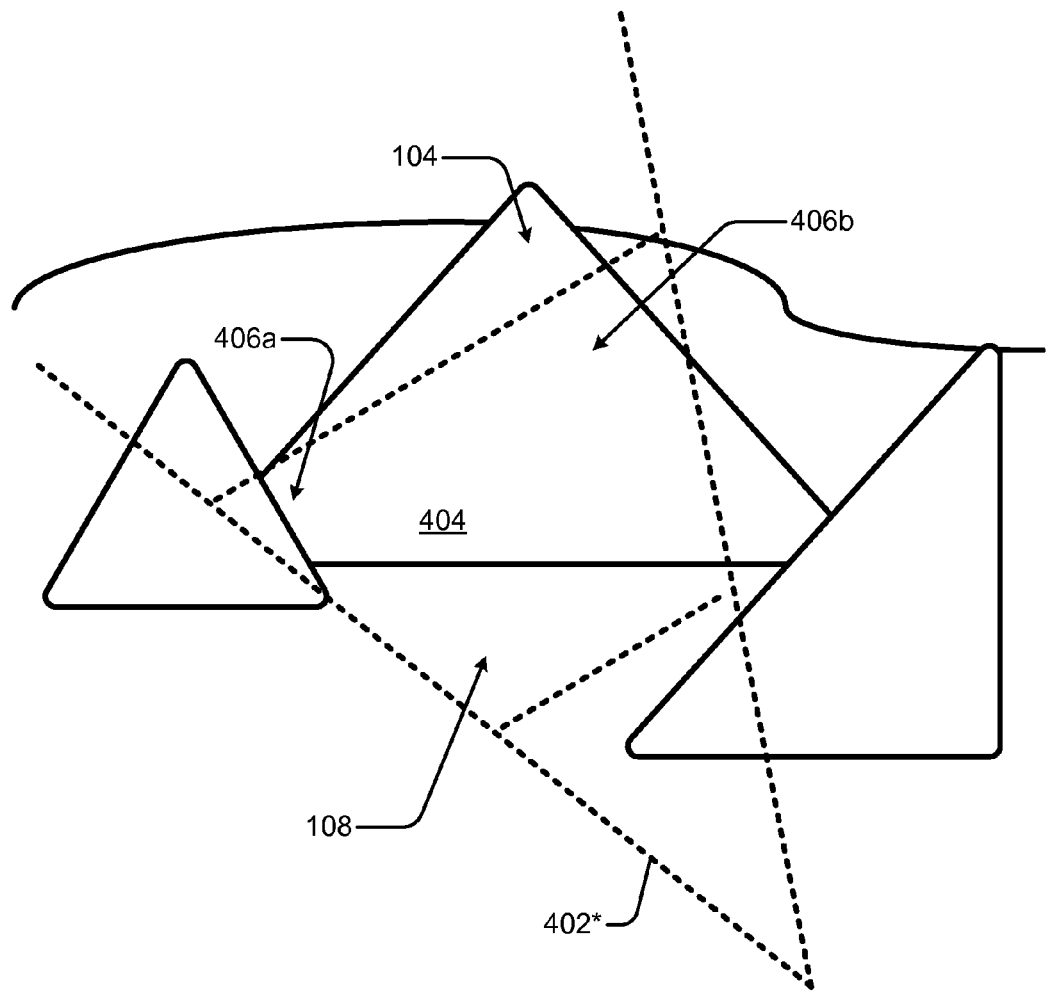

FIGS. 4A and 4B are block diagrams 400A and 400B illustrating examples of how image views may be changed. Both diagrams depict a scenic vista having three mountains and a hilly horizon. The three mountains are represented by three triangles and the hilly horizon is represented by a wavy line. These scenic aspects are not numbered for the sake of clarity. In the figures, the scenic aspects simultaneously represent real-world and reference model aspects. It should be noted that the scenic aspects and explanatory elements are not necessarily drawn to scale. Also, it should be understood that the three-dimensional world as well as the illustrated image view elements may not be ideally presented in the two-dimensional figures.

As illustrated in FIG. 4A, an image 102 is captured from camera position 204. The current view angle and position are indicated by view frustum 402 (delineated by long dashed lines). Image 102 includes visual data 404, such as mountains, fields, buildings, and so forth. These mountains, fields, buildings, etc. are also modeled within reference model 104.

In example embodiments, visual data 404 from image 102 may be applied to reference model 104 to produce an image-augmented model. By way of example, augmented portions 406 are identified in block diagram 400A. As shown, augmented portions 406 extend the image leftward and rightward into regions (delineated by the short dashed lines) of reference model 104 that are not visible in image 102. The extended image 102 is output as modified image 108.

As illustrated in FIG. 4B, the view frustum has been changed such that the view point and perspective between a source image and a modified image 108 is changed. The original source camera position 204 is shown; however, the original source view frustum 402, which is shown in FIG. 4A, is omitted for the sake of clarity in FIG. 4B. Instead, an adjusted view frustum 402* is shown (as delineated by short dashed lines). In the example of block diagram 400B, both the directional view angle and the location/position of the view frustum have been changed for the novel image view. It should be noted that one or the other may also be changed.

Two example augmented portions 406a and 406b are explicitly indicated. Augmented portion 406a may also correspond to regions that were occluded from view in original image 102. In other words, for augmented portion 406a, areas blocked from the view of the camera by the smaller mountain on the left may be hallucinated using described implementations to produce modified image 108.

Figure 5:
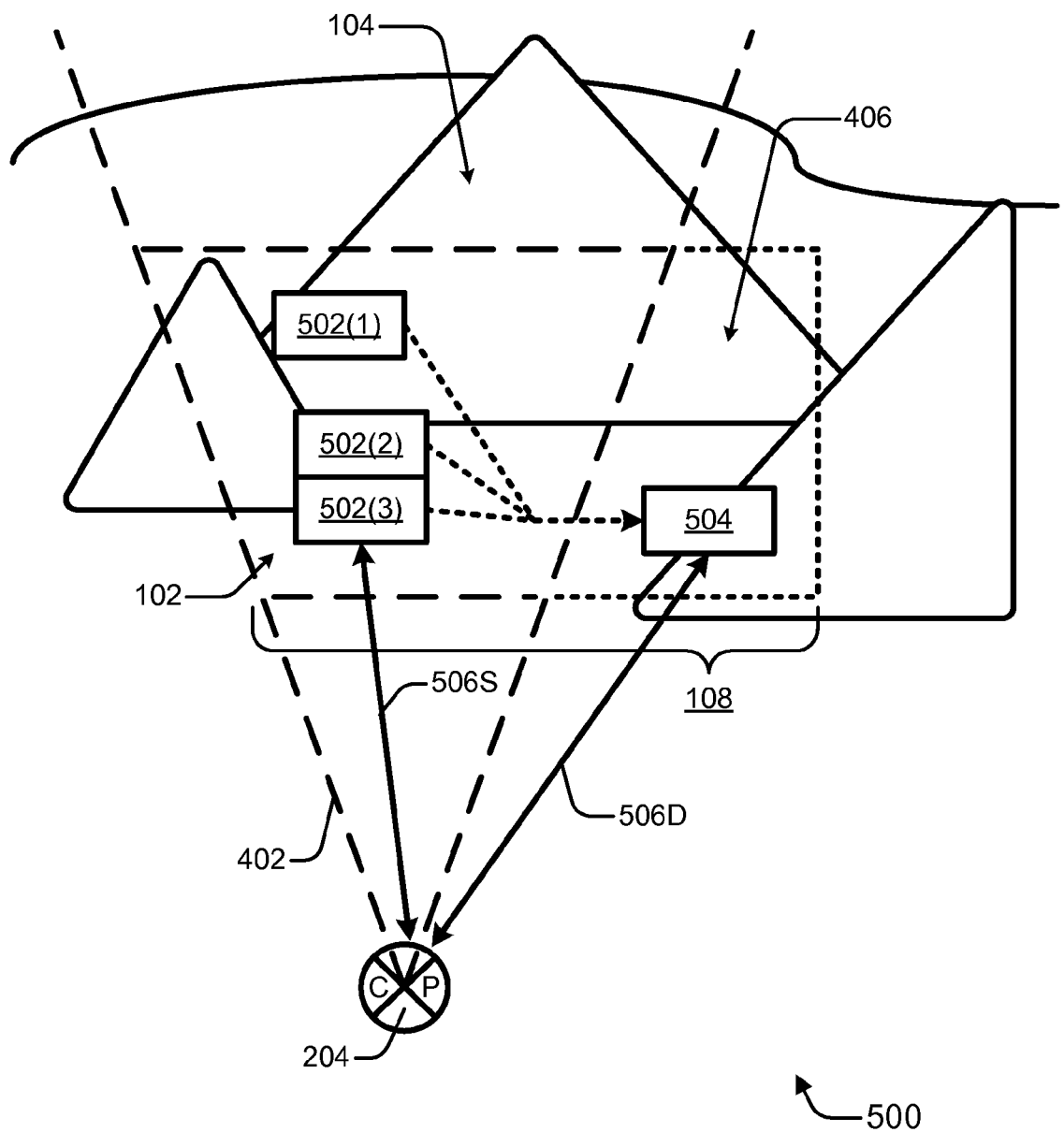
FIG. 5 is a block diagram illustrating an example selection of a source block from an image for application to a destination block of a reference model to produce an image-augmented model.

FIG. 5 is a block diagram 500 illustrating an example selection of a source block 502 from an image 102 for application to a destination block 504 of a reference model 104 to produce an image-augmented model. As illustrated, block diagram 500 includes image 102, reference model 104, modified image 108, camera position 204, view frustum 402, and augmented portion 406. Block diagram 500 also includes source blocks 502, destination block 504, and depths 506. Specifically, a source depth 506S and a destination depth 506D are shown.

For example embodiments, reference model 104 is augmented by applying source blocks 502 to destination blocks 504. For each destination block 504 that is to be included in an augmented portion 406, a source block 502 is selected for application thereto. Usually, each source block 502 includes visual data from image 102, and each destination block 504 includes a texture from reference model 104. Each block 502 or 504 may be a pixel or a set of pixels of any size or shape. Alternatively, each block 502 or 504 may be a patch of a fixed or variable size. Blocks 502 and 504 may be otherwise defined.

The selection of a source block 502 for application to a destination block 504 may be based on one or more criteria, such as the depths 506 of the blocks 502 and 504. Each depth 506 may correspond to a distance between camera position 204 and a block 502 or 504. Thus, each respective source block 502 is associated with a respective source depth 506S. Also, each respective destination block 504 is associated with a respective destination depth 506D.

As shown in block diagram 500, three source blocks 502(1), 502(2), and 502(3) are considered for application to destination block 504. However, any number of source blocks 502 may be considered for each destination block 504. Additionally, other selection criteria may be used. Example other selection criteria include, but are not limited to, relative block positions, color correspondences, keeping proximate blocks together to maintain visual consistency, and so forth. With regard to proximate blocks, the source block of visual data from the image may be selected with regard to the destination block of the reference model responsive to a bias towards selecting proximate source blocks for proximate destination blocks to provide visual consistency to the proximate destination blocks. In this sense, proximate blocks may be considered, for example, those that form a visual element that is identifiable by the human eye.

In operation, a given processing system 210 (of FIG. 2) may operate in any of a number of different manners. For example, an appreciable part of reference model 104 may first be retextured using source blocks 502 from image 102 to create augmented portions 406 and ultimately produce an image-augmented model. Afterwards, a user may change the perspective (e.g., directional angle and/or location) of view frustum 402 to reveal what a modified image 108 would look like. Alternatively, the user may first change the perspective of view frustum 402 and then be presented an interim image having portions of the scene that include the modeled texture of reference model 104. Afterwards, the newly visible portions may be textured by applying source blocks 502 to destination blocks 504. Other operational manners may alternatively be implemented.

Figure 6:
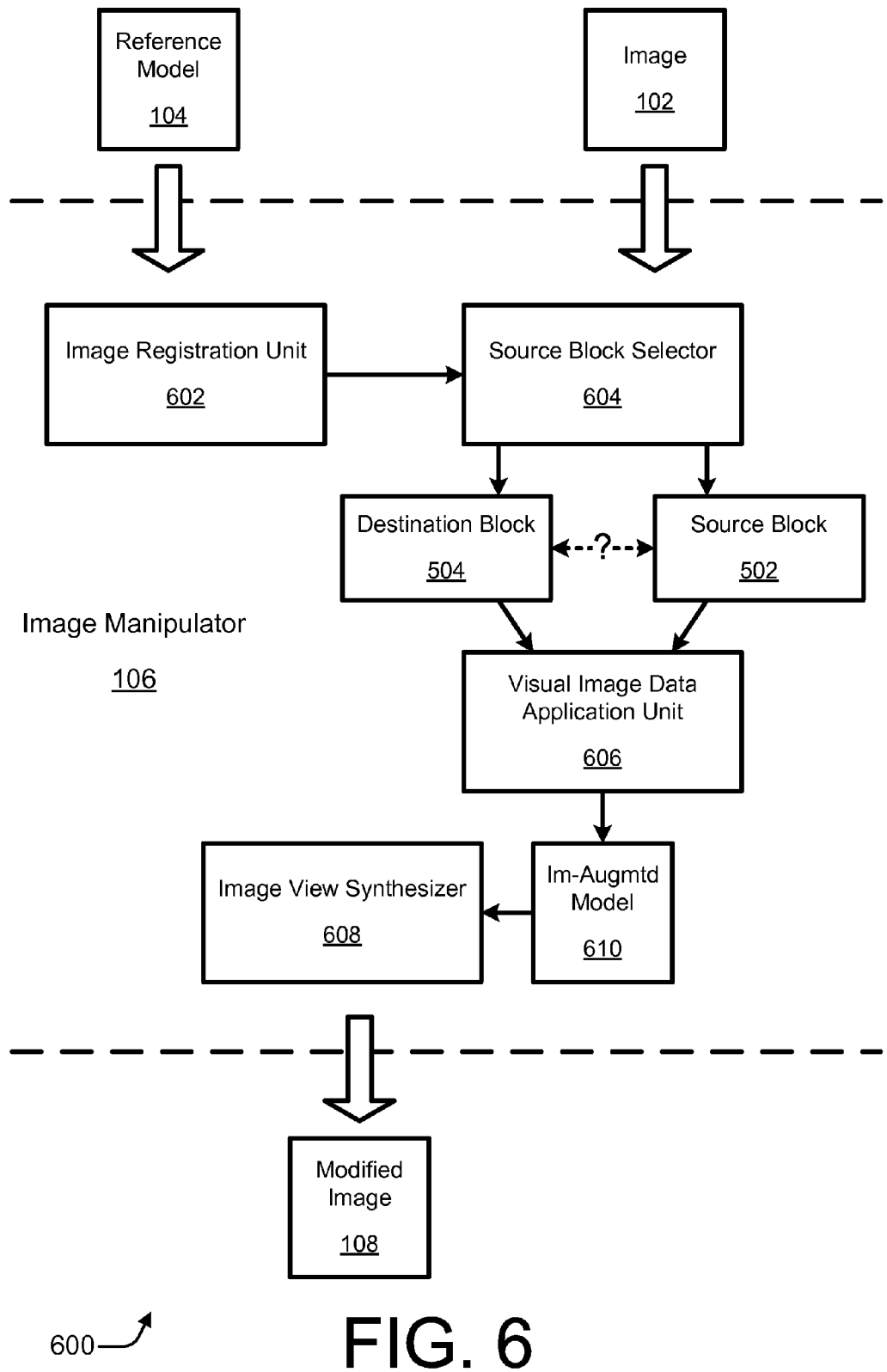
FIG. 6 is a block diagram of an example image manipulator that enhances an image by producing a modified image having a novel image view using a reference model and an image view synthesizer.

FIG. 6 is a block diagram 600 of an example image manipulator 106 that enhances an image 102 by producing a modified image 108 having a novel image view using a reference model 104 and an image view synthesizer 608. As illustrated, image manipulator 106 includes an image registration unit 602, a source block selector 604, a visual image data application unit 606, and image view synthesizer 608. Image manipulator 106 operates with and/or produces source blocks 502, destination blocks 504, and an image-augmented model 610. Image-augmented model 610 is formed from reference model 104 with one or more augmented portions 406 (of FIGS. 4A, 4B, and 4C).

Image 102 and reference model 104 are input to image manipulator 106. Image manipulator 106 outputs modified image 108. Thus, for certain example embodiments, image manipulator 106 includes an image registration unit 602, a source block selector 604, a visual image data application unit 606, and an image view synthesizer 608. Image registration unit 602 registers image 102 to at least one reference model 104. Source block selector 604 selects a source block 502 having visual data from image 102 with regard to a destination block 504 of reference model 104 based on a source depth associated with source block 502 and a destination depth associated with destination block 504. A position of destination block 504 of reference model 104 need not be visible in image 102. Visual image data application unit 606 applies the visual data of source block 502 from image 102 to destination block 504 of reference model 104 to produce an image-augmented model 610. Image view synthesizer 608 synthesizes a novel image view using image-augmented model 610.

Example quantitative approaches to synthesizing novel views are described next. Novel view synthesis can provide the ability to modify the viewpoint from which an original photograph was taken or otherwise change the original view frustum. Effectively bringing static photographic images to life in such a manner can significantly enhance the photo browsing experience. Once a photographic image is registered with a sufficiently accurate geometric reference model of the corresponding real-world scene, a challenge in changing the viewpoint involves completing the missing texture in areas that are either occluded or are merely outside the original view frustum.

In example embodiments, image completion is used to "fill" the missing areas with texture from the photographic image. The image completion process is analogous to paint or "texture"-by-numbers. However, instead of a hand-painted label map, a guidance map is used to derive the textures for portions of the 3D reference model that are to be augmented. In rural areas, reference models are typically aerial images of the terrain. In urban areas, reference models usually include texture maps of the buildings.

In example implementations, the texture is synthesized over a cylindrical layered depth image (LDI), which is centered on the original camera position. The LDI stores, for each pixel, the depths and normals of scene points intersected by the corresponding ray from the viewpoint. This data structure is able to represent both the visible and the occluded parts of the scene. The colors of the front-most layer for each pixel are taken from the original image if they are inside the original view frustum. The remaining colors are synthesized using a guided texture transfer, as described herein.

Although a different number of layers for the LDI may be used, an example number of depth layers per pixel is four. It should be noted that although the relatively quantitative description herein refers to a source or destination block 502 or 504 as having a size of one pixel, the principles are also applicable to different block sizes and shapes.

In an example operation, the texture transfer process is started by computing guiding values for layers of the LDI at each pixel. The guiding value is a vector (U, V, D), where U and V are the chrominance values of the corresponding point in the model texture, and D is the distance or depth to the corresponding scene point from the location of the camera. Although other values and approaches may be used, an example depth range is from 0 to 5000 meters, which may be normalized to a [0, 1] interval. By ignoring the luminance channel, problems associated with the existence of transient features, such as shading and shadows, in the model textures are alleviated.

Texture synthesis may be implemented in a multi-resolution manner. The first (and coarsest) level is synthesized by growing the texture outwards from the known regions. For each unknown destination pixel, a square neighborhood around it is examined. An exhaustive search may be conducted for a matching neighborhood source from the known regions of the image. By way of example only, an $L_2$ norm criterion may be used to determine a degree of matching.

Usually, because these neighborhoods contain missing pixels, neither PCA compression nor other speed-up structures may be applied, at least not in a typical straight-forward way. However, the first level is sufficiently coarse, so its synthesis can be relatively fast. To synthesize each next level, the result of the previous level may be upsampled and a relatively small number of k-coherence synthesis passes are performed to refine the result. By way of example, a 5×5 look-ahead region with k=4 may be used, but other values may alternatively be used.

An example approach to implementing a k-coherence scheme is as follows. First, for each pixel's neighborhood in the source image, the k closest neighborhoods within the same image are found. Second, when synthesizing a targeted image, the location of each target pixel in the source image is stored (e.g., the location from where it is copied). Third, when searching a closest neighborhood for a given target pixel, instead of considering all possible neighborhoods, the k closest neighborhoods of the pixels surrounding the target pixel may be considered. As a result, merely k×5×5 neighborhoods are to be considered if 5×5 is the neighborhood size. This can achieve a significant speedup.

It should be noted that when working with LDIs, the concept of a pixel's neighborhood is adjusted to account for the existence of multiple depth layers at each pixel. By way of example, the neighborhood of a pixel may be defined as follows: On each depth layer, a pixel has up to 8 pixels surrounding it. If the would-be neighboring pixel has multiple depth layers, the pixel on the layer with the closest depth value is assigned as the "immediate" or actual neighbor. However, other neighborhood definitions may alternatively be implemented, such as some form of averaging, interpolation, and so forth.

To render images from novel viewpoints, a shader is used to project the LDI image onto the reference model by computing the distance of the model to the camera position and then using the pixel color from the depth layer closest to this distance. Unfortunately, significant changes in the viewpoint eventually cause texture distortions, if source texture from the image alone is continually applied to destination areas of the model. To ameliorate this problem, the visual data from the image may be blended with the texture of the reference model as the new virtual camera is moved farther away from the original viewpoint.

This blending can increase the aesthetic appearance of the 3D viewing experience, often even for drastic view changes, such as switching to a bird's eye view. Generally, a proportional amount of the visual data of the source block from the image that is applied to the destination block of the reference model may be decreased as a novel perspective viewpoint corresponding to the novel image view deviates further from a capture perspective viewpoint corresponding to the image. This blending may be implemented as part of the application of the source blocks to the destination blocks and/or as part of the synthesis of the novel image view.

Thus, to implement blending, the texture color T at each terrain block x is given by Equation (1) as follows:

$$T(x) = g(x) T_{photo}(x) + (1-g(x)) T_{model}(x), \quad (1)$$

where the blending factor g(x) is determined with respect to the current view. By way of example, the blending factor may be determined according to the following principles: (i) pixels in the original photograph that correspond to surfaces facing the camera are considered more reliable than those on oblique surfaces; and (ii) pixels in the original photograph are desirable whenever the corresponding scene point is viewed from the same direction in the current new view as the scene point was in the original view. However, the blending factor may be determined according to different principles.

For a specific example implementation, the variable n(x) denotes the surface normal, $C_0$ denotes the original camera position from which the photograph was taken, and $C_{new}$ denotes the current camera position. Also, $v_0 = (C_0 - x)/\|C_0 - x\|$ denotes the normalized vector from the scene point to the original camera position, and similarly $v_{new} = (C_{new} - x)/\|C_{new} - x\|$. Then g(x) can be set as shown in Equation (2):

$$g(x) = \max(n(x) \cdot v_o, v_{new} \cdot v_o). \quad (2)$$

In other words, the blending factor g(x) is defined by Equation (2) as the greater between (i) the cosine of the angle between the normal and the original view direction and (ii) the cosine of the angle between the two view directions.

With changes to the view frustum, the depth of objects in the modified image may differ from those of the original image or the objects may be new to the modified image. Because haze affects images based at least partially on the distance between the camera and the objects of the image, haze may be added and/or adjusted when producing the modified image from the image with a novel image view synthesis. Dehazing and re-hazing may be performed on-the-fly. For example, haze may first be removed from the image. After the novel image view has been synthesized, haze may be added back into the image based on the depth of objects. This re-hazing for the modified image uses the current distances from the current camera position to the various objects.

FIG. 7 is a block diagram 700 illustrating example devices 702 that may be used to implement embodiments for image view synthesis using a three-dimensional reference model. As illustrated, block diagram 700 includes two devices 702a and 702b, person-device interface equipment 712, and one or more network(s) 714. As explicitly shown with device 702a, each device 702 may include one or more input/output interfaces 704, at least one processor 706, and one or more media 708. Media 708 may include processor-executable instructions 710.

For example embodiments, device 702 may represent any processing-capable device. Example devices 702 include personal or server computers, workstations, hand-held or other portable electronics, entertainment appliances, network components, some combination thereof, and so forth. Device 702a and device 702b may communicate over network(s) 714.

Network(s) 714 may be, by way of example but not limitation, an internet, an intranet, an Ethernet, a public network, a private network, a cable network, a digital subscriber line (DSL) network, a telephone network, a wireless network, some combination thereof, and so forth. Image submission and manipulation may both be performed at one device 702. Alternatively, a user may submit an image at one device 702a, and the image manipulation may occur at another device 702b. Regardless, reference models may be located at the same or a different device 702 (e.g., that is likewise accessible over network 714). Person-device interface equipment 712 may be a keyboard/keypad, a touch screen, a remote, a mouse or other graphical pointing device, a display screen, a speaker, and so forth. Person-device interface equipment 712 may be integrated with or separate from device 702a.

I/O interfaces 704 may include (i) a network interface for monitoring and/or communicating across network 714, (ii) a display device interface for displaying information on a display screen, (iii) one or more person-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) person-device interfaces include those that communicate by wire or wirelessly to person-device interface equipment 712. A given interface may function as both a display device interface and a person-device interface.

Processor 706 may be implemented using any applicable processing-capable technology, and one may be realized as a general-purpose or a special-purpose processor. Examples include a central processing unit (CPU), a microprocessor, a controller, a graphics processing unit (GPU), a derivative or combination thereof, and so forth. Media 708 may be any available media that is included as part of and/or is accessible by device 702. It includes volatile and non-volatile media, removable and non-removable media, storage and transmission media (e.g., wireless or wired communication channels), hard-coded logic media, combinations thereof, and so forth. Media 708 is tangible media when it is embodied as a manufacture and/or as a composition of matter.

Generally, processor 706 is capable of executing, performing, and/or otherwise effectuating processor-executable instructions, such as processor-executable instructions 710. Media 708 is comprised of one or more processor-accessible media. In other words, media 708 may include processor-executable instructions 710 that are executable by processor 706 to effectuate the performance of functions by device 702. Processor-executable instructions 710 may be embodied as software, firmware, hardware, fixed logic circuitry, some combination thereof, and so forth.

Thus, realizations for image view synthesis using a three-dimensional reference model may be described in the general context of processor-executable instructions. Processor-executable instructions may include routines, programs, applications, coding, modules, objects, components, metadata and definitions thereof, data structures, APIs, etc. that perform and/or enable particular tasks and/or implement particular abstract data types. Processor-executable instructions may be located in separate storage media, executed by different processors, and/or propagated over or extant on various transmission media.

As specifically illustrated, media 708 comprises at least processor-executable instructions 710. Processor-executable instructions 710 may comprise, for example, image manipulator 106 (of FIGS. 1 and 6) and/or processing system 210 (of FIG. 2). Generally, processor-executable instructions 710, when executed by processor 706, enable device 702 to perform the various functions described herein. Such functions include, by way of example but not limitation, those that are illustrated in flow diagram 300 (of FIG. 3) and those pertaining to features illustrated in the various block diagrams, as well as combinations thereof, and so forth.

The devices, acts, features, functions, methods, modules, data structures, techniques, components, etc. of FIGS. 1-7 are illustrated in diagrams that are divided into multiple blocks and other elements. However, the order, interconnections, interrelationships, layout, etc. in which FIGS. 1-7 are described and/or shown are not intended to be construed as a limitation, and any number of the blocks and/or other elements can be modified, combined, rearranged, augmented, omitted, etc. in many manners to implement one or more systems, methods, devices, media, apparatuses, arrangements, etc. for image view synthesis using a three-dimensional reference model.

Although systems, methods, devices, media, apparatuses, arrangements, and other example embodiments have been described in language specific to structural, logical, algorithmic, and/or functional features, it is to be understood that the invention defined in the appended claims is not necessarily limited to the specific features or acts described above. Rather, the specific features and acts described above are disclosed as example forms of implementing the claimed invention.

What is claimed is:

1. One or more processor-accessible tangible media comprising processor-executable instructions for image view synthesis, wherein the processor-executable instructions, when executed, direct a device to perform acts comprising:

registering an image to at least one reference model;

selecting a source block of one or more pixels of visual data from the image with regard to a destination block of the reference model based on a depth criterion and a color criterion;

wherein each pixel of each source block includes two or more depth levels, with each depth level having a separate color assignment;

wherein the color assignment of a frontmost layer of each pixel is the same color as a corresponding pixel of the image, and wherein a color assignment of each subsequent depth layer for each pixel is synthesized via multi-resolution texture synthesis;

applying each pixel of the source block of visual data from the image to the destination block of the reference model using a computed distance of the reference model to a position of a camera used to capture the image, and using the pixel color assignment from the depth layer closest to the computed distance to produce an image-augmented model;

wherein applying each pixel further comprises decreasing a proportional amount of the visual data of the source block from the image that is applied to the destination block of the reference model as a novel perspective viewpoint corresponding to a novel image view deviates further from a capture perspective viewpoint corresponding to the image; and synthesizing the novel image view using the image-augmented model.

2. The one or more processor-accessible tangible media as recited in claim 1, wherein:
the act of selecting comprises selecting the source block of visual data from the image with regard to the destination block of the reference model responsive to a bias towards selecting proximate source blocks for proximate destination blocks to provide visual consistency for the proximate destination blocks.

3. A method for synthesizing a novel image view, the method comprising using a computing device to perform steps for:
registering an image to at least one reference model;
selecting a source block of visual data from the image with regard to a destination block of the reference model based on a source depth associated with the source block and a destination depth associated with the destination block;
wherein each pixel of each source block includes two or more depth levels, with each depth level having a separate color assignment;
wherein the color assignment of a frontmost layer of each pixel is the same color as a corresponding pixel of the image, and wherein a color assignment of each subsequent depth layer for each pixel is synthesized via multi-resolution texture synthesis;
applying each pixel of the source block of visual data from the image to the destination block of the reference model using a computed distance of the reference model to a position of a camera used to capture the image, and using the pixel color assignment from the depth layer closest to the computed distance to produce an image-augmented model;
wherein the step for applying comprises a step for decreasing a proportional amount of the source block of visual data from the image that is applied to the destination block of the reference model as a novel perspective viewpoint corresponding to a novel image view deviates further from a capture perspective viewpoint corresponding to the image; and
synthesizing the novel image view using the image-augmented model.

4. The method as recited in claim 3, wherein the step for selecting comprises:
selecting the source block of visual data from the image with regard to the destination block of the reference model based on a source color of the visual data of the source block and a destination color of a texture of the destination block.

5. The method as recited in claim 3, wherein the step for selecting comprises:
selecting the source block of visual data from the image with regard to the destination block of the reference model based on a source position of the source block and a destination position of the destination block.

6. The method as recited in claim 3, wherein the step for selecting comprises:
selecting the source block of visual data from the image with regard to the destination block of the reference model responsive to a bias towards selecting proximate source blocks for proximate destination blocks to provide visual consistency for the proximate destination blocks.

7. The method as recited in claim 3, wherein zero or more pixels corresponding to a destination position of the destination block of the reference model are not visible in the image because the destination position of the destination block is not within a captured view frustum through which the image was acquired or because the destination position of the destination block is occluded in the image by an object that is positioned between a capture position of the camera when the image was acquired and the destination position of the destination block.

8. The method as recited in claim 3, wherein the source block and the destination block correspond to a pixel.

9. The method as recited in claim 3, wherein the image is acquired with a captured view frustum; the method further comprising:
receiving input from a user to change a perspective of the captured view frustum to
a modified view frustum; and
wherein the step for synthesizing comprises using the image-augmented model with the modified view frustum to synthesize the novel image view.

10. The method as recited in claim 3, wherein the step for synthesizing comprises:
using augmented portions of the image-augmented model to extend the image to synthesize the novel image view, the novel image view having extended portions that are not included in the image.

11. A system for synthesizing a novel image view, comprising:
an image registration device that causes a computer to register an image to at least one reference model;
a source block selector device that causes a computer to select a source block of one or more pixels of visual data from the image with regard to a destination block of the reference model based on a source depth associated with the source block and a destination depth associated with the destination block;
wherein each pixel of each source block includes two or more depth levels, with each depth level having a separate color assignment;
wherein the color assignment of a frontmost layer of each pixel is the same color as a corresponding pixel of the image, and wherein a color assignment of each subsequent depth layer for each pixel is synthesized via multi-resolution texture synthesis;
a visual image data application device that causes a computer to apply the source block of visual data from the image to the destination block of the reference model using a computed distance of the reference model to a camera position at which the image was originally captured, and using the pixel color assignment from the depth layer closest to the computed distance to produce an image-augmented model;
wherein applying the source block of visual data further comprises decreasing a proportional amount of the visual data that is applied to the destination block as a novel perspective viewpoint corresponding to a novel image view deviates further from a capture perspective viewpoint corresponding to the image; and
an image view synthesizer device that causes a computer to synthesize the novel image view using the image-augmented model.

12. The system of claim 11, wherein the image view synthesizer causes the computer to synthesize the novel image view over a layered depth image that is at least approximately centered at the camera position at which the image was originally captured; and
wherein the layered depth image includes for each respective block a respective depth and normal of a scene point intersected by a corresponding original viewpoint.

13. The system of claim 12, wherein for a given block having a given depth, when a would-be neighboring block has multiple depth layers, a particular block on a layer with a particular depth that is closest to the given depth of the given block is assigned as the neighboring block.

14. The system of claim 12, wherein the visual image data application unit uses a shader to project the layered depth image onto the reference model by computing a distance between the reference model and the camera position and using a color of a block from a depth layer that is closest to the computed distance.

15. The system of claim 11, wherein the source block selector causes the computer to compute respective guiding values that reflect respective chrominance values and distances between the camera position and respective corresponding scene points.

16. The system of claim 11, wherein the source block selector causes the computer to search, for each given destination block of the reference model, for a neighborhood of source blocks that matches a neighborhood around each given destination block.

17. The system of claim 11, wherein the image view synthesizer causes the computer to blend texture from the reference model into the novel image view as a current viewpoint deviates from an original viewpoint.

18. The system of claim 17, wherein the image view synthesizer causes the computer to blend the texture from the reference model into the novel image view based on a blending factor that is set responsive to an angle between a normal and an original view direction and responsive to an angle between the original view direction and a new view direction.

* * * * *